June 27, 1939. H. R. SCHUTZ 2,164,285
TUMBLER-HANDLING APPARATUS
Filed June 2, 1937 3 Sheets-Sheet 2
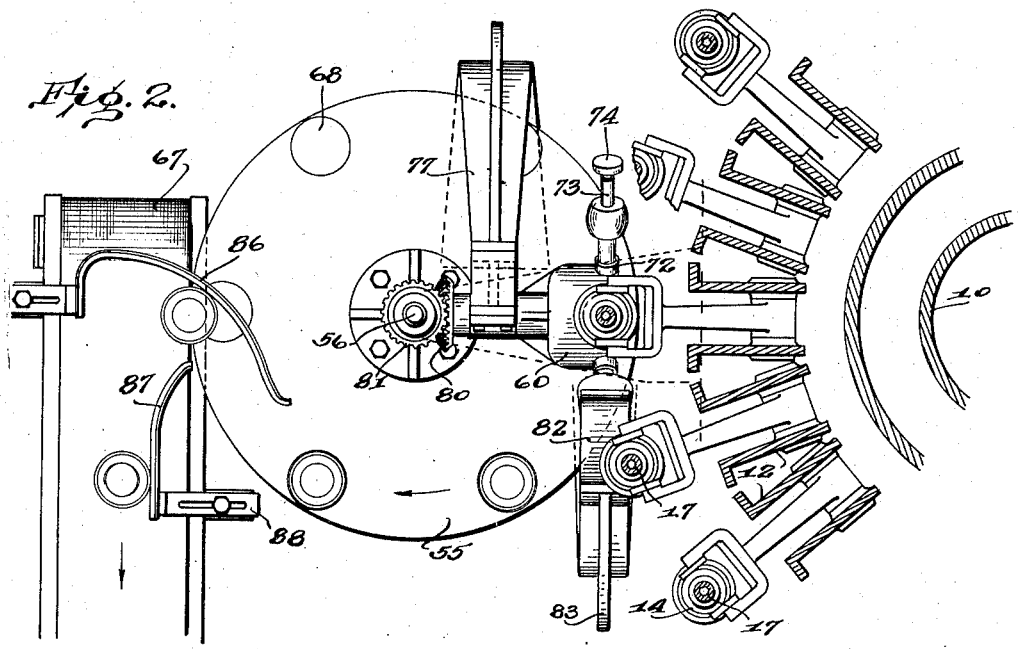
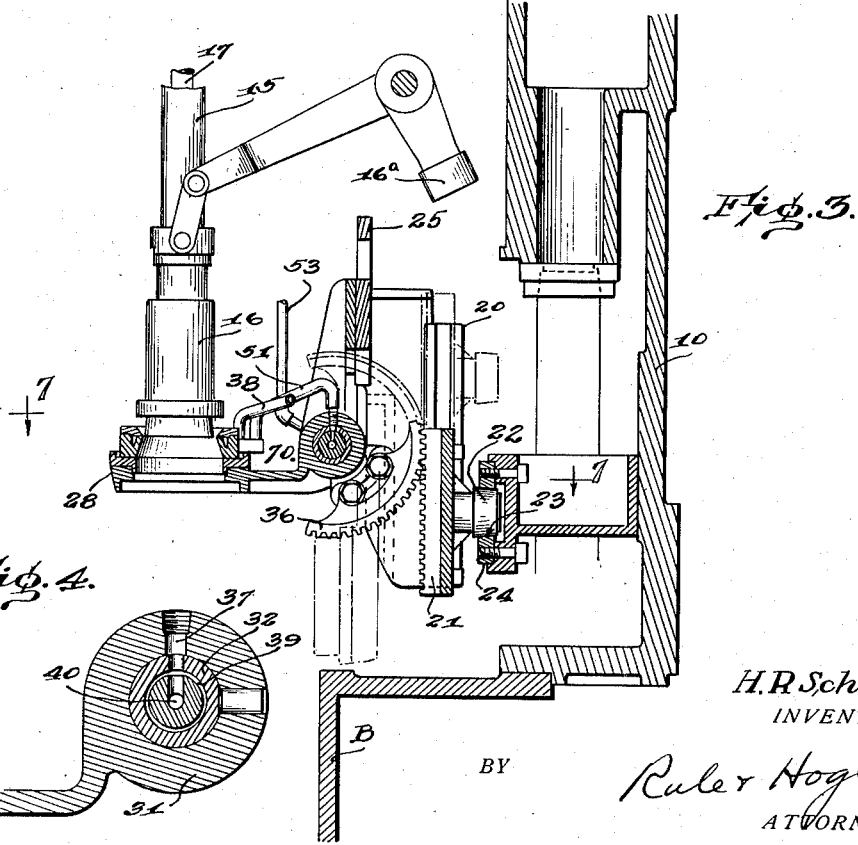
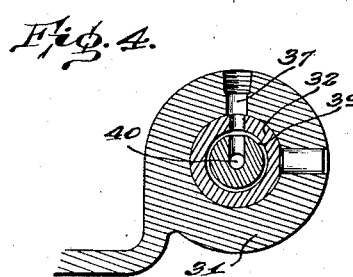
H. R. Schutz
INVENTOR
BY Ruler Hoge
ATTORNEYS June 27, 1939.   H. R. SCHUTZ   2,164,285
TUMBLER-HANDLING APPARATUS
Filed June 2, 1937    3 Sheets—Sheet 3
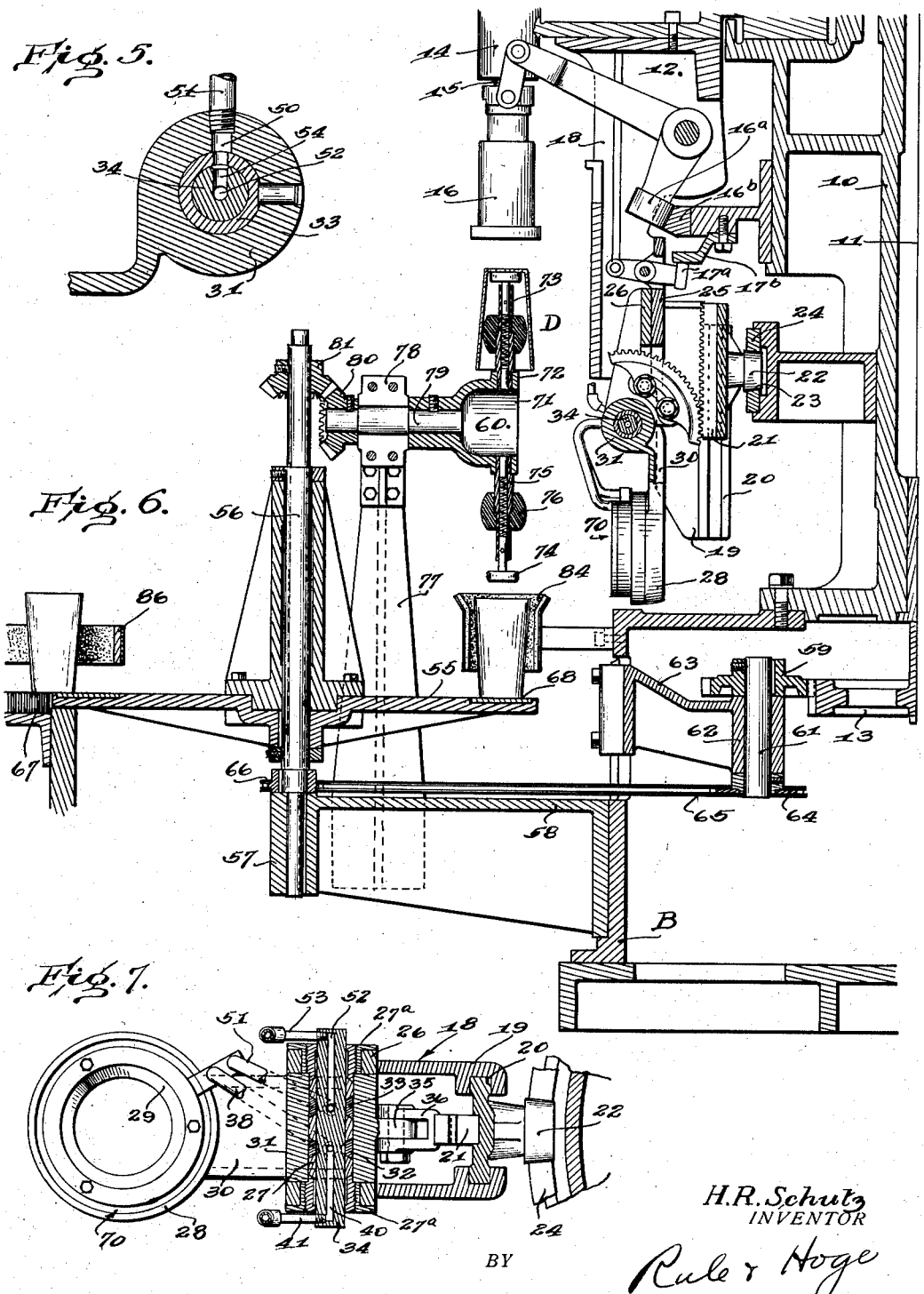
H. R. Schutz
INVENTOR
BY Rule & Hoge
ATTORNEYS Patented June 27, 1939

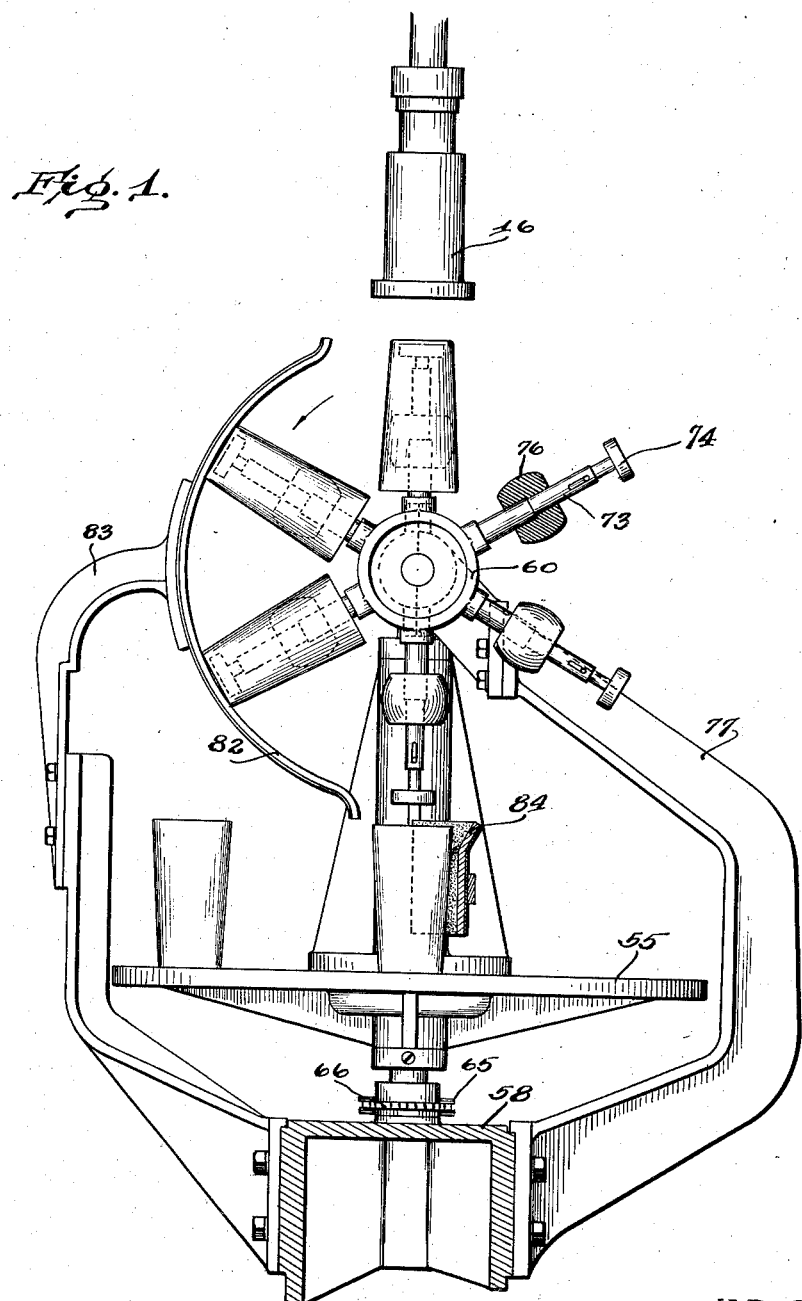

2,164,285

UNITED STATES PATENT OFFICE 2,164,285

TUMBLER-HANDLING APPARATUS

Harold R. Schutz, Toledo, Ohio, assignor to Libbey Glass Company, a corporation of Ohio Application June 2, 1937, Serial No. 146,072

8 Claims. (Cl. 198—25)

The present invention relates to improvements in apparatus for severing glass by a burning-off operation, and more particularly to an apparatus for removing moile from articles of glassware in which the glass and burner travel in a circular path while the burning off of the moile is being accomplished.

Still more specifically, the invention is designed as an improvement over the rotary burn-off machine and takeout mechanism therefor disclosed in the patent to Parker, No. 1,757,211, issued May 6, 1930, for a Rotary burn-off machine.

The apparatus disclosed in the above mentioned patent to Parker is designed for removing moile from glass tumblers and includes a rotary carriage having mounted thereon a series of circumferentially spaced burners, above which are positioned and aligned therewith respective vertically movable chucks which receive therein the inverted unfinished tumblers having moile thereon. At a predetermined point in the circular path of movement of the chucks and burners, the tumblers are lowered by the chucks into the region of the respective burners and the moile is burned off. The moile-free tumblers are again elevated and conducted, during the remainder of their circular travel in the apparatus, to a discharging zone where they are released by the chucks and dropped by gravity in their inverted position onto a series of "pegs" carried on a rotary "peg table" forming a part of a takeout device, by means of which they are moved clear of the apparatus. In the operation of the apparatus just described, it is required that an operator be stationed at the discharge region thereof to remove the inverted tumblers from the rotary "peg table" and place the same on a cross conveyor in an upright position preparatory to conveying the same to an annealing leer.

The principal object of the present invention is to provide a rotary burn-off machine of the general type disclosed in the above mentioned patent to Parker which will dispense with the necessity of employing an operator at the discharging zone for the purpose of upending the tumblers and transferring the same to the leer conveyor by performing that operation automatically. Toward this end the invention contemplates the provision of a machine of the type just referred to in which there has been substituted in lieu of the rotary "peg table", a rotary "peg wheel" or carrier forming part of a take-off device which operates to receive the inverted tumblers from which moile has been removed and upend the same automatically and place the same in an upright position on a transfer wheel or table, also forming a part of the take-off device, by means of which the tumblers are placed in an upright position on a cross conveyor at the receiving end of an annealing leer.

In connection with the present invention, the "peg wheel" just referred to is, of necessity, positioned directly in the path of the moving burners which operate to perform the burning-off operation on the tumblers. It is another object of the invention, therefore, to provide a novel form of burner construction by means of which the moving burners are each automatically swung downwardly about a horizontal axis as they approach the discharging zone in order that they may clear the "peg wheel" while, at the same time, the supply of oxygen to the burner is discontinued until after the burners have passed the peg wheel and are again moved into their operative position.

Other objects of the invention will become readily apparent as the description of the invention ensues.

In the accompanying drawings:

Fig. 1 is a front elevational view, partly in section, of a take-off and transfer mechanism constructed in accordance with the principles of the present invention;

Fig. 2 is a top plan view of the takeout and transfer mechanism showing the same operatively disposed between the burn-off machine of which it forms a part and the cross conveyor;

Fig. 3 is a fragmentary vertical sectional view taken through one of the burners employed in connection with the present invention;

Fig. 4 is an enlarged vertical sectional view taken through a gas port provided in the burner disclosed in Fig. 3;

Fig. 5 is an enlarged vertical sectional view taken through an oxygen port provided in the burner disclosed in Fig. 3;

Fig. 6 is a fragmentary vertical sectional view taken through the burn-off machine and transfer machine forming a part thereof in the region of the discharging zone of the machine; and Fig. 7 is a fragmentary horizontal sectional view taken along the line 7—7 of Fig. 3.

Reference may be had to the patent to Parker, above referred to, for a full description of the general type of burn-off machine herein shown and for a description of the operation thereof. The machine (Fig. 6) comprising the present invention is similar in many respects to the machine described in the said patent and consists of a central vertical column 10 through which there extends a drive shaft 11, the upper end of which drives a carrier 12 in a fashion not shown. The lower end of the shaft 11 has mounted thereon a gear 13 which is driven in any suitable manner from a motor (not shown).

Supported in spaced relationship around the carrier 12 and movable therewith are a series of vertical bearings 14 (Fig. 6) in which there are mounted rotatable and vertically slidable sleeves 15, the latter carrying at their lower ends vacuum chucks 16 which are connected to a source of vacuum through a vacuum conduit 17 (Fig. 3) extending through the sleeves 15.

The rotating vacuum chucks 16 are adapted to receive therein the inverted tumblers with the moile thereon and the sleeves 15 and chucks 16 carried thereby are adapted to be lowered to present the rotating tumblers to respective burners which will presently be described and which operate to burn off the moile. The raising and lowering of the sleeves 15 and chucks 16 are controlled by means of respective cam and lever mechanisms 16$^a$ (Fig. 6) which are actuated by a cam 16$^b$ secured to the central column 10. The application of vacuum to the chucks 16 is controlled by respective cam and lever mechanisms 17$^a$ which are actuated by a cam 17$^b$ also secured to the column 10. The cams 16$^b$ and 17$^b$ are designed so that the tumblers are maintained in the chucks by vacuum during the burning-off operation with the chucks in their lowered positions and are released from the chucks at a discharging zone D after the moile has been removed and the chucks have been again elevated.

The arrangement of parts thus far described is purely conventional, having been described in the above mentioned patent to Parker, and no claim is made in this application to any novelty existing in connection therewith, the invention residing rather in the novel form of take-off device which includes a member hereinafter referred to as a "peg wheel" and which is designated at 60, and in a novel form of burner assembly, designated at 70, which is capable of being moved from an operative position to an inoperative position in advance of arrival at the discharging zone D in order that the same may clear the peg wheel 60 which is positioned directly in its path of movement.

Referring now to Fig. 6, a burner bracket 18 is suspended from the carrier 12 in the vicinity of and directly behind each chuck 16, inwardly thereof. The lower end of each burner bracket 18 is provided with a bifurcated offset portion 19 (Figs. 6 and 7) having opposing guideways 20 in which there is mounted for vertical sliding movement a rack bar 21, the movements of which are controlled by a cam roller 22 which extends into a cam slot 23 provided between upper and lower cam plates 24, which extend around the central column 10 and are supported therefrom. A web 25 extending across the bifurcated portion of the bracket 18 has secured thereto a second bracket 26, the lower portion of which is bifurcated and serves to support the swinging burner assembly 70 above referred to.

The burner assembly 70 includes a burner 28 having an annular slot 29 therein adapted to direct an annular flame toward an article or tumbler supported in the chuck 16. The burner 28 is carried by an arm 30 having a sleeve 31 integrally formed therewith, in which sleeve there is disposed a pair of bearing rings 32 and 33 (Fig. 7) which are secured thereto. The sleeve 31 and rings 32 and 33 are rockably supported upon a central shaft 34 which is supported from the bracket 26.

The sleeve 31 is provided with a lug 35 to which there is secured for angular adjustment a gear segment 36 designed to mesh with the rack bar 21. Thus it will be seen that upon lowering of the rack bar 21, the burner 28 will be swung outwardly into alignment with its respective vacuum chuck 16 and that upon raising of the rack 21, the burner 28 will be swung inwardly to an inoperative position.

The burner 28 is adapted to remain lighted in its inoperative position by the constant application of fuel gas thereto and is adapted to be energized to an intense heat for the purpose of burning the moile from the tumblers by the application of oxygen or other energizing gaseous medium to the same for admixture with the fuel gas only when the same is swung outwardly to its operative position. Toward this end, packing material 27 (Fig. 7) is disposed within the sleeve 31 between the rings 32 and 33 and on each side thereof and is maintained in place by means of packing nuts 27$^a$. The sleeve 31 and ring 32 are provided with a common port 37 (Fig. 4) which is connected through a conduit 38 (Fig. 7) with the burner 28. The shaft 34 is provided with an annular recess 39 (Fig. 4) communicating with the port 37, and a passageway 40 provided in the shaft 34 communicates at one end thereof with a fuel gas supply conduit 41 (Fig. 7) and at the other end with the annular recess 39. Thus it will be seen that the supply of fuel gas to the burner 28 is at all times maintained from the supply conduit 41 through the passageway 40, recess 39, port 37, and conduit 38. The sleeve 31 and ring 33 are provided with a common port 50 (Fig. 5) which is connected through a conduit 51 with the burner. A passageway 52 (Fig. 7) provided in the shaft 34 communicates at one end thereof with a supply of oxygen or other energizing gaseous medium through a conduit 53 and at the other end with a port 54 which is designed to register with the port 50 when the burner is in its operative extended position as indicated in Figs. 3 and 7. When the burner is in the inoperative position shown in Fig. 6, the port 54 is closed by the ring 33 and the supply of energizing gas to the burner is discontinued.

Referring now to Figs. 1, 2 and 6, the take-off mechanism comprises a rotary transfer table 55 mounted for vertical adjustment on a shaft 56 which is supported in a vertical bearing 57 carried at the outer end of a bracket 58 secured to the base B. The transfer table 55 is adapted to be rotated in timed relation to the movement of the rotary burn-off machine and accordingly, the gear 13 (Fig. 6) which drives the carrier 12 meshes with a gear 59 mounted on a shaft 61 supported in a vertical bearing 62 formed on a bracket 63 mounted on the base B for vertical adjustment thereon. The lower end of the shaft 61 is provided with a sprocket 64, and a chain 65 passing over the sprocket 64 also passes over a sprocket 66 mounted medially on the shaft 56.

The transfer table 55 occupies a position in the vicinity of the discharging zone D between the forming machine proper and a leer conveyor 67 (Fig. 2) and is adapted to receive thereon the successive tumblers from which the moile has been removed and transfer the same in an upright position to the cross conveyor 67. The tumblers are successively deposited on the transfer table 55 in an upright position by means of the peg wheel 60 or carrier previously mentioned and which receives the inverted tumblers at the discharging zone from the chucks 16 by gravity upon cessation of the application of vacuum thereto. In order that the tumblers shall not be damaged upon impact with the transfer table 55, a series of asbestos pads 68 are embedded in the table at spaced points therearound and are adapted to receive the tumblers thereon.

The peg wheel 60 consists of a central hub member 71 (Figs. 1 and 6) having a series of radially extending bosses 72 formed thereon in which bosses there are secured radial hollow arms 73. Cushioning members 74 project from the free ends of the arms 73, and coil springs 75 disposed within the arms 73 serve to yieldably maintain the cushioning members 74 in position. Each arm 73 has mounted thereon medially of its ends a resilient centering member 76 having a maximum external diameter slightly less than the diameter of the rims of the tumblers issuing from the burning-off machine proper. The peg wheel 60 is supported directly beneath the path of travel of the chucks 16 and is adapted to be rotated about a horizontal axis in timed relation to the movement of the burn-off machine. Accordingly a bracket 77 (Fig. 1) extends upwardly from the horizontal bracket 58 around the transfer table and carries at its upper end a bearing 78. The hub member 71 is secured to a horizontal shaft 79 which is journalled in the bearing 78 and which carries at its rear end a bevel gear 80 which meshes with a similar bevel gear 81 carried by the upper end of the vertical shaft 56. Thus it will be seen that the transfer table 55 and peg wheel 60 are driven in unison and the movements of both are timed with the movement of the burning-off machine proper.

The number of teeth on the various gears and sprockets which cooperates to drive the peg wheel 60 and transfer table 55 from the burning-off machine are calculated in order that radially extending arms 73 will become successively aligned with successive chucks 16 at the discharging station D precisely at the moment when the vacuum supply thereto is discontinued, and also in order that the cushioning pads 68 will be moved into tumbler receiving position precisely as the tumblers are discharged from the peg wheel 60. Thus, the inverted tumblers carried by the chucks 16 are released and fall by gravity onto the arms 73 in the manner shown in Fig. 6 and are inverted by the peg wheel 60 and deposited successively on the transfer table 55.

In order that the tumblers shall not be thrown clear of the transfer table 55 or leave the peg wheel 60 due to centrifugal force, an arcuate guard 82 (Figs. 1 and 2) mounted on a bracket 83 carried by the bracket 58 engages the bottoms of the tumblers which slide thereon and are maintained in position on the arms 73.

The tendency of the tumblers to leave the peg wheel 60 tangentially adjacent the bottom thereof, together with their tendency to fall on the table 55 in their direction of motion due to rotation of the latter, requires the provision of a stationary abutment 84 which overlies the table 55 and against which the tumblers are thrown as they leave their respective arms 73 on the peg wheel 60. The abutment 84 is arcuate in form to conform to the curved sides of the tumblers and is lined with asbestos or other heat resisting material which is sufficiently soft that it will not damage the tumblers and which will resist the residual heat imparted to the tumblers during the burning-off operation. The abutment 84 is mounted on a bracket 85 secured to the base B.

The tumblers which are deposited by the peg wheel 60 on the transfer table 55 in an upright position are carried away from the burning-off machine and are caught by a curved arm 86 (Fig. 2) which overlies a portion of the table, and are swept from the pads 68 and onto the cross conveyor 67. Alignment of the tumblers on the leer conveyor 67 is obtained by means of an arcuate guard 87 which overlies the conveyor and is adjustably secured to a stationary portion thereof by means of a bracket 88.

Modifications of the invention may be resorted to within the scope of the appended claims.

I claim:

1. In a take-off device for transferring cup-shaped glass articles from a glassware forming machine, a rotary carrier including a plurality of radial arms mounted on the carrier for revolution about a horizontal axis, said arms being adapted to receive thereover the inverted articles when the former are erect and to discharge the articles in an upright position when inverted, and a mechanical conveyor for removing the discharged articles.

2. In a take-off device for transferring cup-shaped glass articles from a glassware forming machine, a rotary carrier including a plurality of radial arms mounted for revolution on the carrier about a horizontal axis, said arms being adapted to receive thereover the inverted articles when the former are erect and to discharge the articles in an upright position when inverted, a movable transfer table disposed beneath said carrier upon which the articles are discharged, a plurality of cushioning devices on said transfer table adapted to register in succession with successively inverted arms, and means for rotating said carrier and transfer table in timed relationship.

3. In a take-off device for transferring cup-shaped glass articles from a glassware forming machine, a rotary carrier including a plurality of raidal arms mounted for revolution with the carrier about a horizontal axis, said arms being adapted to receive thereover the inverted articles when the former are erect and to discharge the articles in an upright position when the former are inverted, a movable transfer table disposed beneath said carrier upon which the articles are discharged by gravity, a plurality of cushioning devices on the table adapted to register in succession with successively inverted arms, an arcuate guard spaced from the free ends of the arms against which the articles are adapted to bear during a portion of the time they are becoming inverted to prevent discharge of the articles until the latter have become substantially completely inverted, and means for rotating said carrier and transfer table in timed relationship.

4. In a take-off device for transferring cup-shaped glass articles from a glassware forming machine, a rotary carrier including a plurality of radial arms mounted on the carrier for revolution about a horizontal axis, cushioning means carried at the free ends of said arms, said arms being adapted to receive thereover the inverted articles when the arms are erect and to discharge the articles in an upright position when the arms are inverted, a movable transfer table disposed beneath the carrier upon which the articles are discharged, cushioning devices on said table adapted to register in succession with successively inverted arms, and means for rotating said carrier and table in timed relationship.

5. An article transferring apparatus comprising a horizontal rotary table and an annular series of radial arms mounted for revolution about a horizontal axis above said table, and means for moving said arm.

6. An article transferring apparatus comprising a horizontal rotary table, an annular series of radial arms mounted for revolution about a horizontal axis above aid table, and means whereby movement of the table imparts motion to the arms.

7. An article transferring apparatus comprising a horizontal rotary table, an annular series of radial arms mounted for revolution about a horizontal axis above said table, cushioning means mounted on the free ends of each of said arms, and means for moving said arms.

8. An article transferring apparatus comprising a horizontal rotary table, an annular series of radial arms mounted for revolution about a horizontal axis above said table, a plurality of cushioning pads mounted on said table adapted to register in succession with successive arms, and means for moving said table and arms in synchronism.

HAROLD R. SCHUTZ.